United States Patent [19]
Jamet

[11] 3,854,904
[45] Dec. 17, 1974

[54] APPARATUS FOR SEPARATING FLUIDS
[75] Inventor: Bruno Jamet, Lyon, France
[73] Assignee: Rhone-Poulenc S.A., Paris, France
[22] Filed: Nov. 23, 1973
[21] Appl. No.: 418,201

[30] Foreign Application Priority Data
Nov. 24, 1972  France .............................. 72.41822

[52] U.S. Cl. ................................. 55/158, 210/346
[51] Int. Cl. ............................................ B01d 53/22
[58] Field of Search ......... 55/16, 158; 210/321, 346

[56] References Cited
UNITED STATES PATENTS
| 2,958,391 | 11/1960 | De Rosset | 55/158 |
| 3,336,730 | 8/1967 | McBride et al. | 55/158 |
| 3,735,562 | 5/1973 | Mousseau | 55/158 |

*Primary Examiner*—Charles N. Hart
*Attorney, Agent, or Firm*—Stevens, Davis, Miller & Mosher

[57] ABSTRACT

Apparatus for circulating fluids, especially useful in gas permeation, in which a plurality of rings are stacked one on top of the other in a cylindrical jacket which is closed at each end with an end plate, one of which may be removable. Porous discs are located between each adjacent ring, in recesses formed therein, and each face of each disc is covered with a membrane. Fluid flows into the chambers formed between adjacent discs, and within each ring. For this purpose each ring is provided with a first passage communicating between one end face of the ring and the internal annular face of the ring, the second passage communicating between the internal annular face of the ring and the other end face, the second passage opening onto the internal face at a point generally opposite to the point at which the first passage opens thereonto, the first passage of each ring communicating with the second passage of the adjacent ring. The ring at one end of the stack has its first passage communicating with a supply duct, and the ring at the other end of the stack has its second passage communicating with the outlet duct of the apparatus, discharge channels being provided to let the permeate passing through the membranes escape from the lateral edge of each disc.

7 Claims, 7 Drawing Figures

APPARATUS FOR SEPARATING FLUIDS

The present invention relates to an apparatus for separating fluids, which can be used especially in gas permeation. The present invention is particularly concerned with a separating apparatus in which the fluid to be treated flows in series from one compartment to another, each compartment being defined by the space between the opposite membranes covering two consecutive solid porous discs, each disc being placed between two rings.

Known apparatuses of this type have the disadvantage of being of complicated design and consequently of being expensive, especially because of the means which have to be provided to make them leakproof.

According to the present invention there is provided an apparatus for separating fluids, such apparatus comprising a jacket having two end walls, at least one of which is removable, defining with said jacket a chamber; a stack of rings positioned within said chamber; a recess in at least one end face of a pair of abutting rings adjacent the annular face; porous discs having a membrane lining opposite faces thereof and positioned in said recesses, whereby a compartment is defined within each ring by the annular wall and two adjacent porous discs; a first passage in each ring providing communication between one end face of the ring and the internal annular face of the ring; a second passage in each ring, providing communication between the other end face of the ring and the internal annular face of the ring, the second passage opening onto the internal face at a point substantially opposite to the point at which the first passage opens thereonto, the first passage of each ring communicating with the second passage of the adjacent ring; a fluid inlet duct in one end wall communicating with the first passage of the ring at the adjacent end of the stack; a fluid outlet duct in the other end wall communicating with the second passage of the ring at the other end of the stack and means for removing fluid which has passed through the membranes into each porous disc.

Such an apparatus can withstand high pressures, is easy to assemble and dismantle and in which the necessary leakproofness between the communicating passages of two adjacent rings can be achieved in a simple, reliable and economical manner.

In order that the present invention will be better understood, the following description is given, merely by way of example, reference being made to the accompanying drawings, in which.

Figure 1:
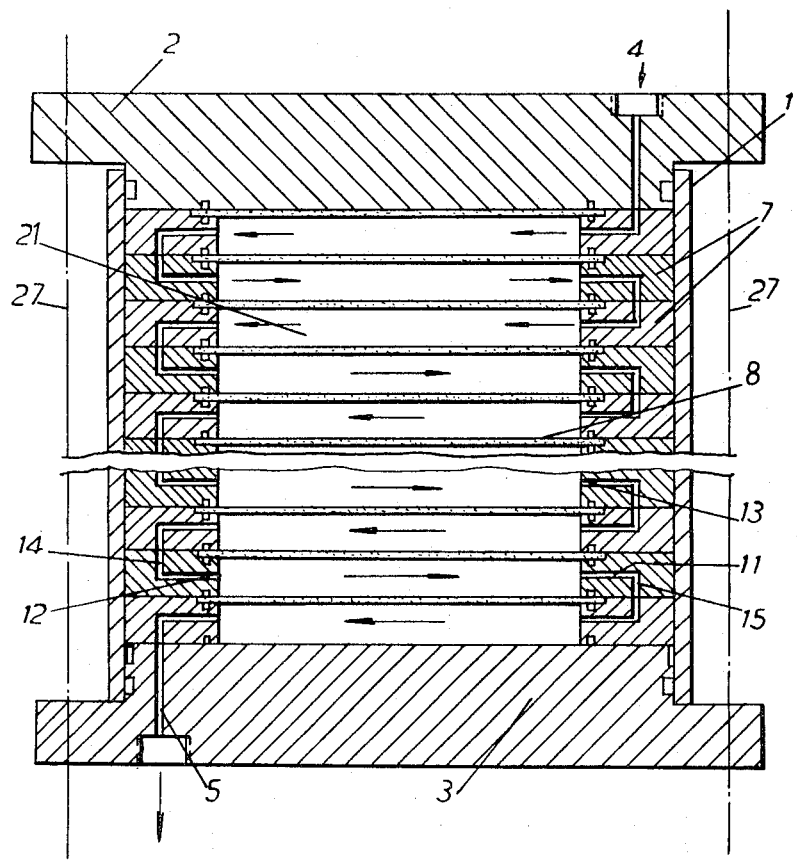
FIG. 1 is a side elevation in cross-section through one embodiment of apparatus according to the invention, and taken along an axial plane corresponding to the line IV—IV of FIG. 3 and showing more particularly the path of the fluid to be treated.
Figure 2:
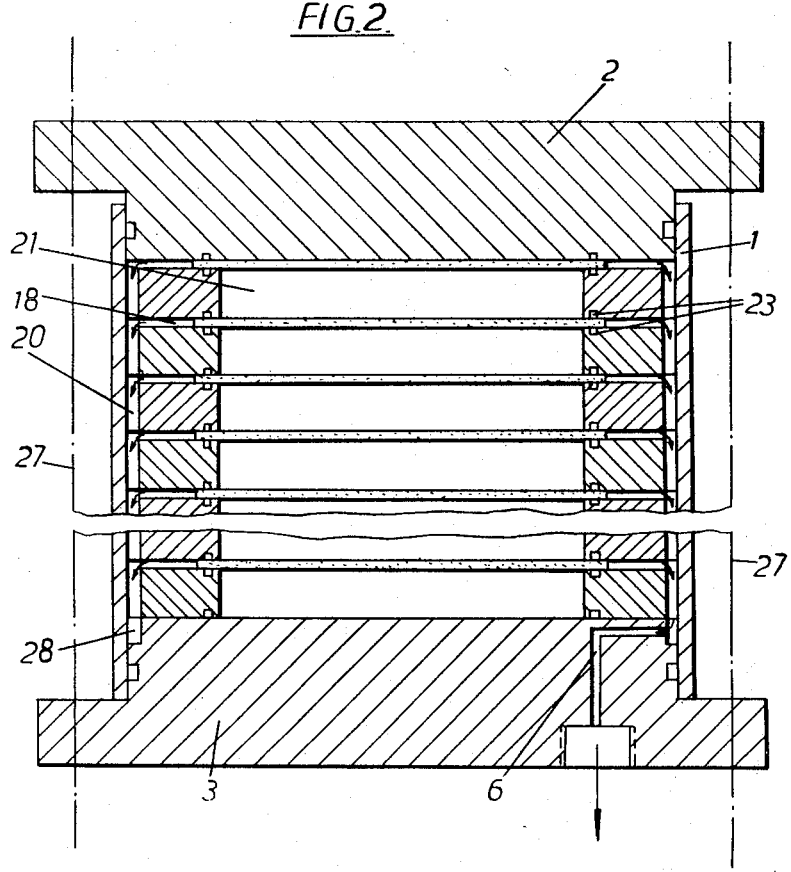
FIG. 2 is a cross-section taken along the line II—II of FIG. 3, showing more precisely the path of the permeate.
Figure 3:
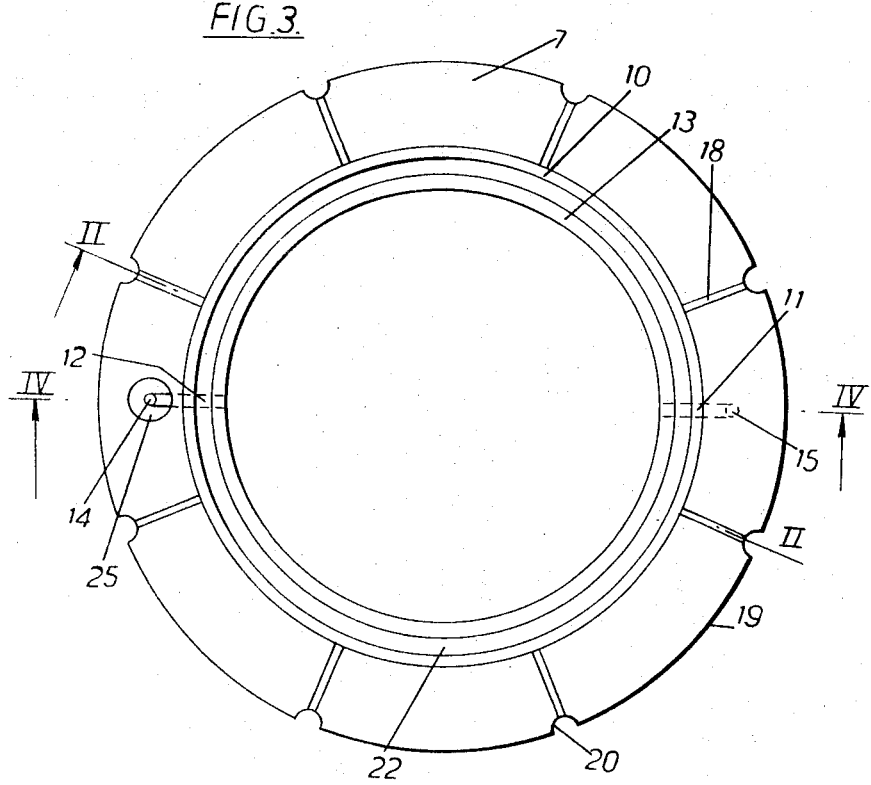
FIG. 3 is an enlarged plan view of a ring used in the apparatus of FIGS. 1 and 2.
Figure 4:
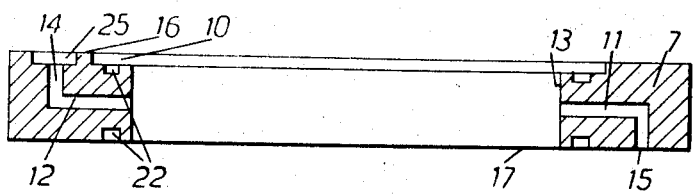
FIG. 4 is a cross-sectional view taken along the line IV—IV of FIG. 3.

An apparatus according to the present invention represented in its entirety in FIG. 1 and FIG. 2, comprises a chamber having a jacket 1, preferably in the shape of a cylinder, and two end plates 2 and 3, at least one of which is removable. Each end plate contains a duct 4 and 5 for the fluid to be treated (see FIG. 1), whilst the permeate is discharged from the chamber of the apparatus via the duct 6 which passes through the end plate 3 as represented in FIG. 2. Inside the chamber defined above, there is a stack of rings 7, one of which is better represented in FIGS. 3 and 4. A solid porous disc 8 covered on its two opposite plane faces by a membrane 9 (FIG. 5) is placed between two consecutive rings 7 in a recess 10 provided in the face of one of the rings.

A ring 7 is formed with at least one pair of preferably radial channels 11 and 12, generally diametrically opposite, opening into the internal face 13 of the ring, these two channels being extended by axial passages 15 and 14 respectively. Thus, the passage 14 opening on the plane face 16 of the ring in question communicates with the channel 12, whilst the passage 15 opens on the opposite plane face 17 of the ring and communicates with the channel 11. For the discharge of the permeate (see FIGS. 2 and 3), grooves 18, communicating on the one hand with the recess 10 of the disc 8 and on the other hand with the external face 19 of the ring 7 in question, are provided on each ring 7. Advantageously, these grooves 18 open on the external face 19 into channels 20 provided on the latter, when the rings 7 are in contact with the internal wall of the jacket 1.

Leakproofness between each compartment 21, defined by the internal surface 13 of each ring 7 and the space between two opposite membranes 9, is ensured by preferably toroidal gaskets. Thus each ring 7 is formed with two concentric grooves 22 in which gaskets 23 are located to ensure leakproofness on the membranes 9 resting on the porous discs 8.

Figure 5:
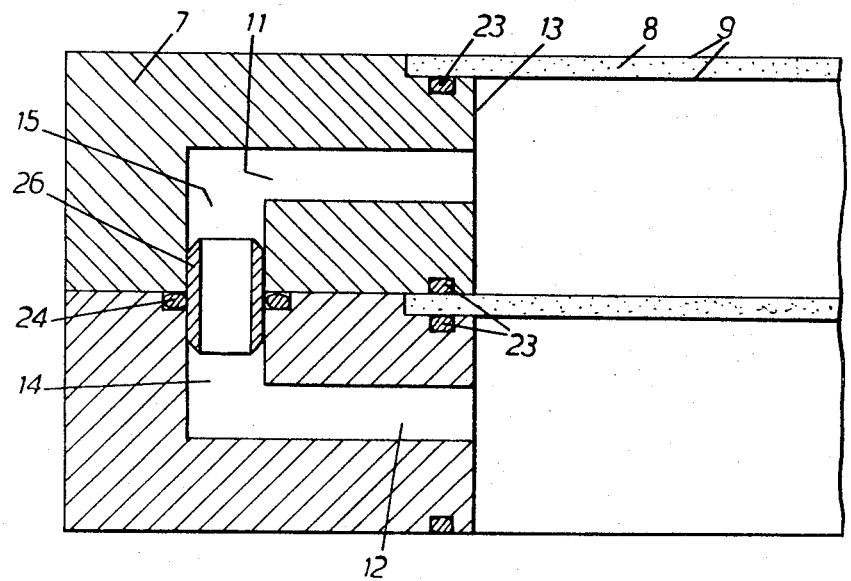
FIG. 5 is a partial cross-sectional view, on a further enlarged scale, of two adjacent rings.

Leakproofness between the communicating passages 14 and 15 of two adjacent rings 7 is ensured by a preferably toroidal gasket 24 situated in a rebate 25 provided, for example, on the face 16 of the ring 7 equipped with the recess 10 for the porous support. Advantageously, this gasket 24 is held by a section of tube 26, as shown in FIG. 5. This section of tube can also be used to centre the rings relative to one another when the apparatus is being assembled and to position them inside the jacket.

Leakproofness between the end plates 2 and 3 and the rings 7 adjacent to these end plates is achieved in the same way as between the rings 7 and adjacent to one another.

The whole apparatus is clamped by means of bolts, only the centre lines 27 of which have been represented in FIGS. 1 and 2, in order to simplify the drawings.

An apparatus according to the present invention functions in the following way. The gas mixture to be treated is introduced into the apparatus via the duct 4 and then passes through each compartment 21 of the apparatus in the direction of the arrows of FIG. 1, after having swept over the membranes 9 of each disc 8. The fluid to be treated thus flows from one compartment to another via the channels 11 and 12 and the communicating passages 14 and 15, and it issues from the apparatus via the duct 5. It is clear that the gas to be treated could alternatively enter the apparatus via the duct 5 and issue via the duct 4. The permeate escapes towards the periphery of the porous disc 8 and travels through the grooves 18 to reach the channels 20, as indicated by the arrows in FIG. 2. The permeate then passes right round the annular recess 28 provided on the end plate 3 to leave the apparatus via the duct 6 at the desired pressure (less than the pressure at which the fluid to be treated is introduced), generally close to atmospheric pressure and optionally under reduced pressure. It is also possible to discharge the permeate via a duct 6 provided on each end plate, or on the cylindrical jacket 1 itself.

Figure 6:
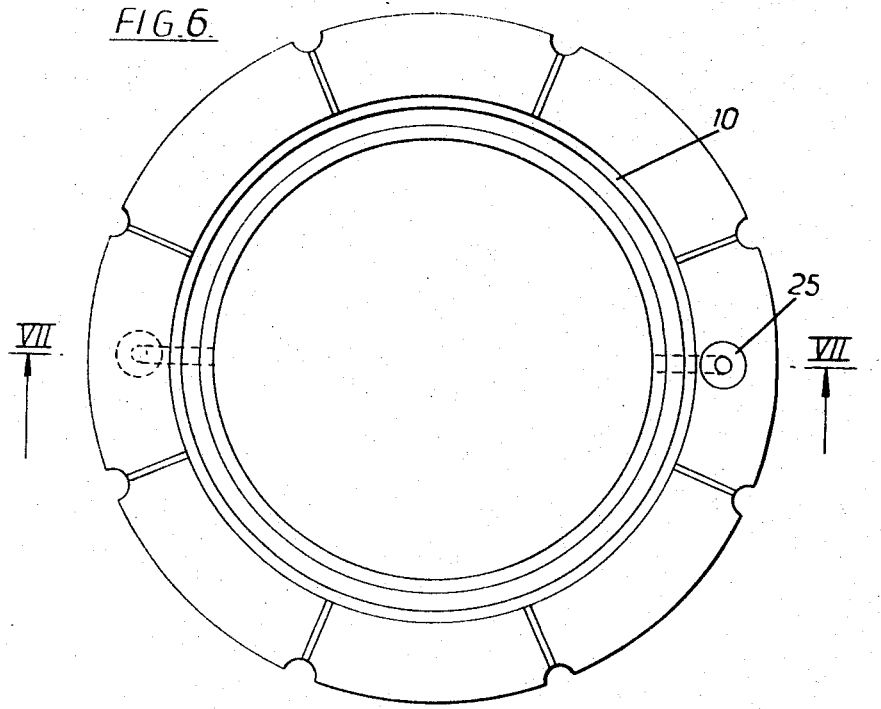
FIG. 6 is a plan view of a different embodiment of a ring.
Figure 7:
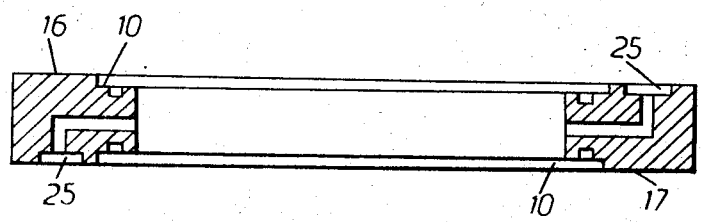
FIG. 7 is a cross-sectional view along line VII—VII of FIG. 6.

Numerous different embodiments of the apparatus according to the invention will be apparent to the technician. For example, it is possible to provide rings such as that represented in FIGS. 6 and 7 in which the positioning recesses 10 for the discs 8 are located on each plane face 16 and 17 of the ring, and the same applies to the rebates 25 for the toroidal gaskets 24. It is also possible to provide a system of baffles inside each ring in order to improve the way in which the membranes inside each compartment are swept over. In order to clamp the apparatus, it can also be advantageous to dispense with the bolts and to have an end plate screwed directly onto the external wall of the jacket, for example, in a manner similar to that used for closing certain laboratory autoclaves.

An apparatus according to the present invention can withstand very high pressures, for example 50 bars. It can be made of very diverse materials. Generally, the chamber is made of steel, as are the rings 7. However, especially when the latter are in contact with the internal wall of the jacket 1, they can be made of plastic, for example of polymethyl methacrylate, and they can be produced, at least partially, by an injection moulding technique. The porous discs 8 can be made of paper impregnated with phenolic resin, coated on their two faces with at least one layer of polymer forming the membrane. The discs 8 can be made of paper impregnated with phenolic resin as above, and can be covered on each face by a removable membrane. Optionally, the discs can consist of two sheets of paper impregnated with phenolic resin on either side of a thin strip, for example of steel, in order to make the combination more rigid. They can also be thicker and can be made of a sintered material such as glass, bronze, stainless steel, polyethylene or polyvinyl chloride.

An apparatus according to the present invention is very particularly suitable for gas permeation, for example for enriching air with oxygen, for recovering hydrogen present in purges, for separating hydrogen from methane in cracking gases, for purifying air polluted with carbon monoxide, for recovering helium mixed with air in recording balloons and dirigible balloons or for separating helium from natural gas.

The apparatus according to the present invention can also be suitable for treating solutions, especially in ultrafiltration or reverse osmosis.

I claim:

1. Apparatus for separating fluids, such apparatus comprising, in combination:
   a. a jacket;
   b. two end walls, at least one of which is removable, defining with said jacket a chamber;
   c. a stack of rings positioned within said chamber, said rings each having end faces abutting the end face of at least one adjacent ring in the stack and an internal annular face;
   d. means defining a recess in at least one end face of a pair of abutting rings adjacent the annular face;
   e. porous discs positioned in said recesses, whereby a compartment is defined within each ring by the annular wall and two adjacent porous discs;
   f. a membrane lining opposite faces of each disc;
   g. a first passage in each ring providing communication between one end face of the ring and the internal annular face of the ring;
   h. a second passage in each ring, providing communication between the other end face of the ring and the internal annular face of the ring, the second passage opening onto the internal face at a point generally opposite to the point at which the first passage opens thereonto, the first passage of each ring communicating with the second passage of the adjacent ring;
   i. a fluid inlet duct in one end wall communicating with the first passage of the ring at the adjacent end of the stack;
   j. a fluid outlet duct in the other end wall communicating with the second passage of the ring at the other end of the stack; and
   k. means for removing fluid which has passed through the membranes into each porous disc.

2. Apparatus as claimed in claim 1, wherein said chamber is substantially cylindrical, and said rings are each circular.

3. Apparatus as claimed in claim 1, wherein the means for removing fluid which has passed through the membranes into each porous disc, comprise means defining at least one groove in at least one of the abutting faces of adjacent rings, said groove communicating with the exterior walls of said rings and with the recess between the two adjacent rings.

4. Apparatus as claimed in claim 3, wherein the exterior wall of each ring contacts the internal wall of the jacket, and further comprising means defining channels extending generally parallel to the stacking axis of the ring between the exterior wall of the rings and the internal wall of the jacket, said grooves communicating with said channels.

5. Apparatus as claimed in claim 1, wherein each of said first and second passages comprises an axial passage communicating with an end face of the ring, and a radial channel connected to the axial passage and to the annular wall of the ring.

6. Apparatus according to claim 5, and further comprising a gasket concentric with each of said axial passages, said gaskets ensuring a leakproof communication between adjacent rings.

7. Apparatus according to claim 6, and further comprising a tube section inserted into the axial passages of each ring, said tube section being surrounded by said gaskets.

* * * * *